United States Patent [19]

Coppola et al.

[11] 4,179,299

[45] Dec. 18, 1979

[54] SINTERED ALPHA SILICON CARBIDE CERAMIC BODY HAVING EQUIAXED MICROSTRUCTURE

[75] Inventors: John A. Coppola, Lewiston; Laurence N. Hailey, Niagara Falls; Carl H. McMurtry, Youngstown, all of N.Y.

[73] Assignee: The Carborundum Company, Niagara Falls, N.Y.

[21] Appl. No.: 24,148

[22] Filed: Mar. 26, 1979

Related U.S. Application Data

[63] Continuation of Ser. No. 901,406, May 1, 1978, abandoned, which is a continuation-in-part of Ser. No. 584,226, Jun. 5, 1975.

[51] Int. Cl.$^2$ ............................................. C04B 35/56
[52] U.S. Cl. ...................................................... 106/44
[58] Field of Search ........................................... 106/44

[56] References Cited

U.S. PATENT DOCUMENTS 4,041,117   8/1977   Prochazka .............................. 106/44

OTHER PUBLICATIONS

"Investigation of Ceramics for High Temperature Turbine Vanes", Final Report for Navy Contract N62269-73-C-0356, published Apr. 1974 by General Electric Company.

Primary Examiner—O. R. Vertiz
Assistant Examiner—Mark Bell
Attorney, Agent, or Firm—David E. Dougherty; Raymond W. Green

[57] ABSTRACT

Pressureless sintered silicon carbide ceramic bodies, having an equiaxed microstructure and an alpha crystalline habit can be produced by firing shaped bodies, containing finely divided silicon carbide, boron source such as boron carbide, carbon source such as phenolic resin and a temporary binder, at a sintering temperature of from about 1900° C. to about 2250° C., depending on the sintering atmosphere, under conditions such that a coating of carbon source is maintained on the finely divided silicon carbide, and sufficient boron is maintained within the shaped body during firing. Boron can be maintained within the shaped body by various techniques, such as the use of a "seasoned boat" or graphite container for the body being sintered, which has been saturated with boron by exposure to boron at or about the temperature of sintering.

There is also disclosed a process for producing a sintered silicon carbide ceramic body, with or without the equiaxed crystal microstructure, from silicon carbide powders of alpha or beta crystal structure, or amorphous noncrystalline silicon carbide, or mixtures thereof.

16 Claims, 7 Drawing Figures

SINTERED ALPHA SILICON CARBIDE CERAMIC BODY HAVING EQUIAXED MICROSTRUCTURE

CROSS REFERENCES TO RELATED APPLICATIONS

This is a continuation of copending application Ser. No. 901,406, filed May 1, 1978, now abandoned, which is a continuation-in-part of copending application Ser. No. 584,226, filed June 5, 1975.

Related subject matter is disclosed in copending, commonly assigned U.S. patent applications Ser. No. 745,035, filed Nov. 26, 1976 by R. H. Smoak, now abandoned; Ser. No. 754,648, filed Dec. 27, 1976 by J. A. Coppola et al, now U.S. Pat. No. 4,123,286; Ser. No. 783,140, filed Mar. 31, 1977 by Y. Murata et al, now U.S. Pat. No. 4,135,937; Ser. No. 783,356, filed Mar. 31, 1977 by Y. Murata et al, now U.S. Pat. No. 4,135,938; Ser. No. 790,354, filed Apr. 25, 1977 by J. A. Coppola et al, now U.S. Pat. No. 4,124,667, Certificate of Correction issued June 19, 1979; Ser. No. 864,415, filed Dec. 27, 1977 by R. H. Ohnsorg; Ser. No. 867,860, filed Jan. 9, 1978 by M. R. Kasprzyk et al; Ser. No. 867,861, filed Jan. 9, 1978 by H. A. Lawler; Ser. No. 885,139, filed Mar. 10, 1978 by H. A. Lawler; and Ser. No. 885,828, filed Mar. 13, 1978 by J. A. Coppola et al. Applications 790,354 and 885,828 are continuing applications, respectively, of application Ser. No. 584,226, filed June 5, 1975 and application Ser. No. 743,448, filed Nov. 22, 1976 by J. A. Coppola et al, now U.S. Pat. No. 4,080,415.

BACKGROUND OF THE INVENTION

The chemical and physical properties of silicon carbide make it an excellent material for high temperature structural applications. These properties include good oxidation resistance and corrosion behavior, good heat transfer coefficients, low expansion coefficient, high thermal shock resistance and high strength at elevated temperature. It is in particular desirable to produce silicon carbide bodies having high density and suitable for engineering material uses, such as for example high temperature gas turbine applications. Silicon carbide is a preferred material for such use, because it can withstand stresses at higher temperatures than conventional materials, and can therefore lead to greater efficiency in the transformation of energy.

Methods of producing high density silicon carbide bodies have heretofore included reaction bonding (also known as reaction sintering), chemical vapor deposition and hot pressing. Reaction sintering involves the use of silicon impregnants to upgrade the density of the silicon carbide and is useful for many applications, but is undesirable where excess silicon exuding from the silicon carbide body would be detrimental. Silicon carbide deposition is impractical for producing complex shapes, and hot pressing (the production of high density silicon carbide bodies by simultaneous application of heat and pressure) is impractical for some shapes, since the pressure required during the hot pressing operation deforms the silicon carbide body and requires that only relatively simple shapes can be produced by this method.

According to applications Ser. Nos. 584,226 and 790,354, there was provided a sintered ceramic body having a high proportion of silicon carbide and a high (greater than 75% theoretical) density, and a process and raw batch for the production of such ceramic bodies, which did not require the use of finely divided "beta" (cubic crystal structure) silicon carbide.

Production of pressureless sintered silicon carbide, and hot pressed silicon carbide has been the subject of substantial inventive effort in recent years. In addition to the patent and applications referred to under "Cross References to Related Applications," all of which are assigned to The Carborundum Company, reference is made to G. Q. Weaver et al, U.S. Pat. No. 3,836,673, patented Sept. 17, 1974 and G. Q. Weaver, U.S. Pat. No. 3,998,646, patented Dec. 21, 1976, both assigned to Norton Company; as well as Svante Prochazka, U.S. Pat. Nos. 3,852,099, patented Dec. 3, 1974; 3,853,566, patented Dec. 10, 1974; 3,954,483, patented May 4, 1976; 3,960,577, patented June 1, 1976; 3,968,194, patented July 6, 1976; 3,993,602, patented Nov. 23, 1976; 4,004,934, patented Jan. 25, 1977; 4,023,975, patented May 17, 1977; and 4,041,177, patented Aug. 9, 1977; and Johnson et al, U.S. Pat. No. 4,031,178, patented June 21, 1977, all assigned to General Electric Company.

In none of the above-identified patents of General Electric Company and Norton Company is there disclosed pressureless sintered alpha silicon carbide ceramic bodies having equiaxed microstructures. The disclosure of a process which comes the closest to this objective is probably contained in U.S. Pat. No. 4,041,117, wherein there is disclosed a process comprising providing a substantially homogeneous particulate dispersion or mixture, wherein the particles are submicron in size, of beta silicon carbide powder, alpha silicon carbide seeding powder, boron additive and a carbonaceous additive which is free carbon or a carbonaceous organic material which is heat-decomposable to produce free carbon, shaping the mixture into a green body, and sintering the green body at temperatures ranging from about 1950° C. to 2300° C. in an atmosphere in which the green body and resulting sintered body is substantially inert, to produce a sintered body having a density of at least 80% of the theoretical density for silicon carbide and a substantially uniform, relatively fine-grained microstructure wherein at least 70% by weight of the silicon carbide present is composed of alpha silicon carbide in the form of platelets or elongated grains which may range in the long dimension from about 5 to 150 microns, and preferably from about 5 to 25 microns.

For some applications of sintered silicon carbide bodies, however, there are advantages to employing a sintered silicon carbide body having an equiaxed microstructure, as opposed to a structure in the form of platelets or elongated grains. Other factors being equal, there are differences in mechanical properties, primarily strength, which depend upon the largest flaw present in a particular sintered ceramic body. The large grains in the form of platelets or elongated grains act as large flaws, and accordingly there is an inverse correlation between the strength of a sintered ceramic body and the largest grain size observable in the microstructure. In other words, a fine-grained equiaxed microstructure is inherently stronger and possessed of other more desirable mechanical properties than a material which is otherwise the same, but has larger grains.

SUMMARY OF THE INVENTION

Accordingly, the present invention provides a sintered ceramic body consisting essentially of from about 91 to about 99.85% by weight silicon carbide, wherein at least 95% by weight of the silicon carbide is of the alpha phase; up to about 5.0% by weight carbonized organic material; from about 0.15 to about 3.0% by weight boron; and up to about 1.0% by weight additional carbon; and having a predominantly equiaxed microstructure. Such a sintered ceramic body can be produced by mixing together a mixture comprising from about 91 to about 99.85 parts by weight silicon carbide powder comprising at least 95% by weight alpha, non-cubic crystalline silicon carbide and having a surface area of from about 1 to about 100 m$^2$/g; from about 0.67 to about 20 parts by weight of a carbonizable organic material having a carbon content of at least 33% by weight; from about 0.15 to about 5 parts by weight of a boron source containing from about 0.15 to about 3.0 parts by weight boron; up to about 15 parts by weight of temporary binder; and from about 25 to about 100% by weight of the silicon carbide powder, carbonizable organic material, boron source and temporary binder of a solvent in which the carbonizable organic material is soluble; said mixing being done in such a way as to disperse the carbonizable organic material about the silicon carbide powder and coat the silicon carbide powder therewith; drying the mixture in such a way as to evaporate the solvent from the mixture; shaping the dried mixture in such a way as to produce a shaped body having a density of at least about 1.60 g/cc; and firing the shaped body under such conditions of time, temperature and atmosphere as to obtain a density of at least about 2.40 g/cc and an equiaxed microstructure, the temperature being between about 1900° C. and 2250° C. It is preferred that the firing take place under conditions such that the level of boron retained in the body being sintered is maintained, for example by enclosing the body being sintered within a sealed container which is impervious to boron at the temperature of sintering, and which has a volume approximating the size of the body being sintered; or by containing the body being sintered within a graphite container, which container has been saturated with boron by exposure to boron at or about the temperature of sintering.

There is also provided, according to this invention, a process for producing a sintered silicon carbide ceramic body, with or without equiaxed crystal microstructure, from silicon carbide powders of alpha or beta crystal microstructure, or amorphous silicon carbide, or mixtures thereof, comprising the steps of mixing together a mixture comprising the components: from about 91 to about 99.85 parts by weight silicon carbide powder having a surface area of from about 1 to about 100 m$^2$/g; from about 0.67 to about 20 parts by weight of a carbonizable organic material having a carbon content of at least 33% by weight; from about 0.5 to about 5 parts by weight of a boron source containing from about 0.15 to about 3.0 parts by weight boron; up to about 15 parts by weight of temporary binder; and from about 25 to about 100% by weight of the silicon carbide powder, carbonizable organic material, boron source and temporary binder of a solvent in which the carbonizable organic material is soluble; said mixing being done in such a way as to disperse the carbonizable organic material about the silicon carbide powder and coat the silicon carbide powder therewith; drying the mixture in such a way as to evaporate the solvent from the mixture; shaping the dried mixture in such a way as to produce a shaped body having a density of at least about 1.60 g/cc; and firing the shaped body at a temperature of from about 1900° C. to about 2500° C.

BRIEF DESCRIPTION OF THE DRAWINGS

FIGS. 2 and 3 show, at different magnifications, the equiaxed microstructure of the present invention produced by sintering at 2120° C. FIGS. 4–7 illustrate the microstructure which is obtained by sintering at higher temperatures.

DETAILED DESCRIPTION

The theoretical density of silicon carbide is 3.21 g/cc. The preferred minimum density of about 2.40 g/cc for sintered ceramic bodies according to the present invention corresponds, therefore, to about 75% of theoretical density. The more highly preferred densities of 2.90 and 3.05 g/cc correspond to 90 and 95% of theoretical density, respectively.

The primary constituent of the sintered ceramic body according to the present invention is silicon carbide, wherein at least 95% by weight of the silicon carbide is of the alpha (non-cubic crystalline) phase. While the process of the present invention is essentially immune to changes in the crystalline phase of the silicon carbide powder used as a starting material, i.e., the process of the present invention does not produce any substantial amount of phase transformation, it has been observed that even if the silicon carbide powder used in the starting material for the present invention consists essentially of silicon carbide of the alpha phase, some small degree of phase transformation may occur, so that some small proportion of the alpha phase material (probably less than 1%, and certainly believed to be less than 5%) may transform to the beta phase. Thus, while in the broad aspects of the present invention the sintered ceramic body contains silicon carbide wherein at least 95% by weight of the silicon carbide is of the alpha phase, it is preferred that at least about 99% by weight of the silicon carbide be of the alpha phase, or that the silicon carbide consists essentially of silicon carbide of the alpha phase.

According to the processes of the prior art, it does not appear to have been possible to obtain a sintered silicon carbide body wherein at least 95% by weight of the silicon carbide is of the alpha phase, and wherein the sintered ceramic body has a predominantly equiaxed microstructure. Although the product of the present invention is therefore thus defined broadly, it is preferred that the microstructure contain at least about 90% equiaxed grains, and more highly preferred that the microstructure consists essentially of equiaxed grains.

Figure 1:
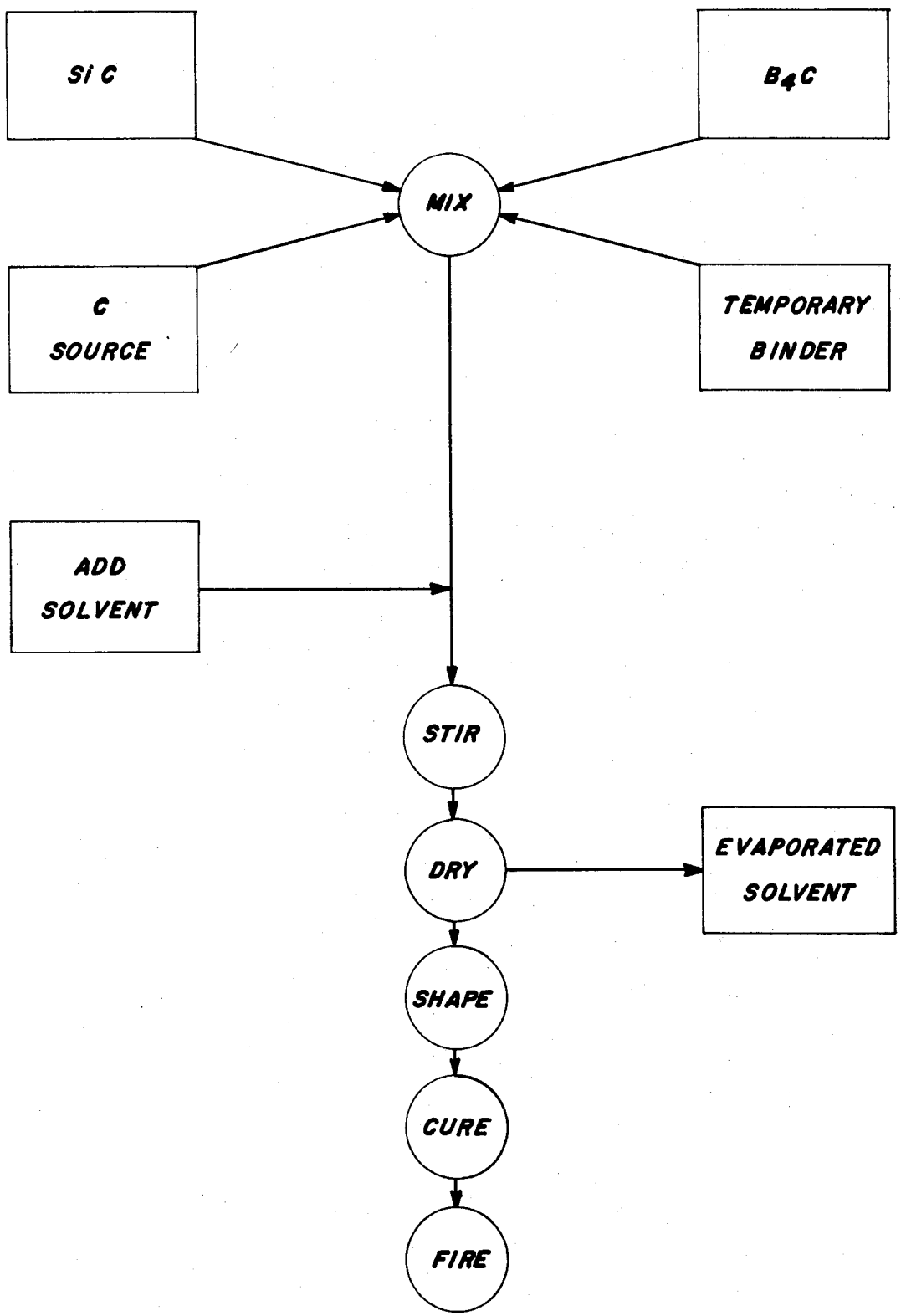
FIG. 1 of the drawing is a flow chart showing a typical sequence of process steps to produce the sintered ceramic body of the present invention.
Figure 2:
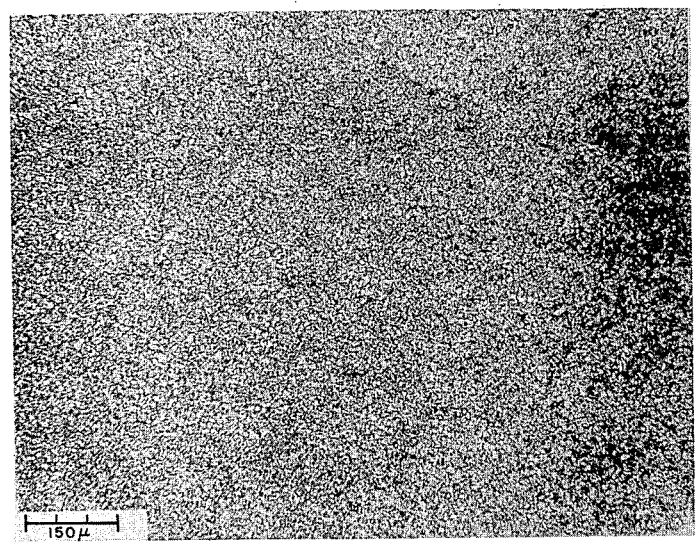
FIGS. 2–7 are photomicrographs.

The term "equiaxed grains" as used herein refers to a crystal microstructure in which the grains have an aspect ratio of less than 3:1, i.e., the ratio of the maximum dimension of the grains of the crystal microstructure to the minimum dimension of the grains of the crystal microstructure is less than 3:1. This microstructure is commonly known as "equiaxed" to distinguish it from crystal structures which are acicular, i.e., contain needle-shaped or tabular crystals, or a feathery microstructure such as illustrated in FIG. 2 of U.S. Pat. No. 4,041,117. The product of the present invention is characterized by the combination of equiaxed grains and alpha phase in the silicon carbide of the sintered ceramic body, a combination not taught by the prior art, although the prior art does teach the production of sintered ceramic bodies having a beta phase and an equiaxed microstructure (using beta phase silicon carbide powder as the starting material).

The preferred composition of the sintered ceramic body in accordance with the present invention consists essentially of from about 91 to about 99.85% by weight silicon carbide, up to about 5.0% carbonized organic material, from about 0.15 to about 3.0% boron, and up to about 1.0% additional carbon. The "carbonized organic material" is free carbon or uncombined carbon produced in situ by the carbonization of the organic material used as a raw material in the process of the present invention. The organic material is carbonized because the organic material is unstable at the temperature to which the body being sintered is subjected, and the non-carbon components of this organic material are driven from the carbon skeleton of the organic material (i.e., volatilized away). Although the temperature attained during the process of the present invention is not sufficient to volatilize the carbon, some carbon may be oxidized to carbon monoxide or carbon dioxide. Thus, depending upon the proportion of organic material used in the process of the present invention, the firing temperature, and other factors, there may be no carbon in the form of carbonized organic material present in the sintered body at all. Usually, however, a minor proportion of carbon as carbonized organic material will remain. It is, however, very difficult to determine the amount of carbon present, since the oxidation test to determine the amount of carbon present will oxidize and remove a minor proportion of the silicon carbide matrix. The amount of carbon which is present as carbonized organic material will also depend upon the amount of such organic material which was added to the raw batch and the carbon content (char yield) of the organic material. While the preferred carbonizable organic materials for use in the process of the present invention are phenolic resin and coal tar pitch, which have carbon contents of from about 40 to about 42% and on the order of 60%, respectively, the carbon content of the organic material can be in excess of 90%, as for example in polyphenylene or polymethylphenylene.

Within the broad composition recited above, it is preferred that the sintered ceramic body contain from about 0.5 to about 4% carbonized organic material, from about 0.18 to about 0.36% boron and from about 0.05 to about 0.10% additional carbon, with the balance of the composition being silicon carbide. In particular, it is preferred that the sintered ceramic body contain about 2% of carbonized organic material, about 0.36% boron, and about 0.1% additional carbon. All percentages herein are by weight, unless otherwise specified. The amount of "additional carbon" depends on the amount of carbon associated with the boron present in the raw batch mixture from which the sintered ceramic body was made.

In carrying out the process of the present invention, if the sintered body is to have a high alpha silicon carbide content, it is preferred to begin with a silicon carbide powder which comprises at least 95% by weight alpha, non-cubic crystalline silicon carbide. It is more highly preferred, however, that the silicon carbide of the raw batch comprises at least 99% by weight alpha silicon carbide, or that the silicon carbide of the raw batch consists essentially of alpha silicon carbide.

The firing step of the process of the present invention preferably takes from about 20 to about 60 minutes at temperatures of from about 1900° to about 2500° C.

Lower temperatures are in general inoperable, and higher temperatures may cause sublimation of the silicon carbide material. If a sintered ceramic body having a predominantly equiaxed microstructure is to be obtained, the firing should be under such conditions of time, temperature and atmosphere as to obtain a density of at least about 2.40 g/cc and an equiaxed microstructure, said temperature being between about 1900° C. and about 2250° C. Within this range, the sintering temperature necessary to obtain an equiaxed microstructure, i.e., in order to avoid the formation of needles and platelets within the crystal microstructure, depends to a certain extent on factors such as the impurities present in the silicon carbide and the presence of absence of nitrogen in the sintering atmosphere. If there are no excessive impurities present, and the firing is to be done in a vacuum or in an atmosphere which excludes nitrogen (such as an atmosphere of up to about 1 atmosphere of pressure of a gas selected from the group consisting of argon, carbon dioxide, carbon monoxide, helium, hydrogen, neon and mixtures thereof), the preferred temperature of firing in order to obtain an equiaxed crystal microstructure is between about 1900° C. and about 2160° C., more preferably from about 2100° C. to about 2150° C. The presence of impurities in the silicon carbide will influence this temperature range. In particular, when using "black" silicon carbide containing a high aluminum content (on the order of 0.2% aluminum by weight of silicon carbide), temperature control is more important, and even the temperature of 2160° C. may be too high. The usual raw material for use in the present invention is "green" grain silicon carbide, containing about 0.02% or less aluminum. If the amount of the aluminum present in the silicon carbide is less than 0.02%, even higher temperatures can be tolerated without loss of the predominantly equiaxed microstructure. The presence of nitrogen in the sintering atmosphere raises the minimum temperature necessary to achieve satisfactory sintering, and also raises the temperature at which the equiaxed microstructure is lost, so that when sintering in a nitrogen atmosphere, a predominantly equiaxed microstructure can be obtained even if the temperature is between about 1975° C. and about 2300° C. Within this range, in a nitrogen atmosphere, a firing temperature of between about 2100° C. and about 2250° C. is preferred. In any event, the preferred firing time varies from about 20 to about 60 minutes.

As used herein, "predominantly" means greater than 50%.

In carrying out the present invention, it is preferred to take steps to maintain the level of boron retained in the body being sintered. In this connection, placing the article to be sintered in a fresh graphite "boat" which has never been used in sintering before tends to have a detrimental effect upon the density obtained. This is because the fresh graphite boat acts as a "boron sink" which withdraws boron from the article being sintered, thus preventing the boron from fully achieving its role in promoting sintering and densification of the article being sintered.

Various techniques can be used in order to maintain the boron within the shaped body during the sintering operation. U.S. Pat. No. 4,080,415 describes, for example, the introduction of a gas such as boron trichloride into the sintering atmosphere and painting the furnace components with a solution or slurry containing a boron compound. Another technique for maintaining the level of boron retained in the body being sintered is to incorporate greater amounts of boron in the article to be sintered. Another technique of maintaining the level of boron retained in the body being sintered is to enclose the body being sintered within a sealed container which is impervious to boron at the temperature of sintering (such as a glass container), and which has a volume approximating the size of the body being sintered. A preferred technique of maintaining the level of boron retained in the body being sintered is to contain the body being sintered within a "seasoned boat," i.e., a graphite container which has been saturated with boron by exposure to boron at or about the temperature of sintering. Such exposure occurs naturally through the sintering operation, and it has been observed that better results (i.e., higher densities) can be obtained by the use of graphite boats which have been used for sintering operations previously, sufficiently often to become saturated with boron.

The silicon carbide powder for use in the present invention has a surface area of from about 1 to about 100 $m^2/g$. Such silicon carbide powders are usually less than 20 microns in particle size, more particularly less than 10 microns in particle size; and in particular submicron size particles are generally preferred. It is difficult, however, to obtain accurate particle size distributions for silicon carbide powders having size much less than 1 micron in particle size, and the surface area of the silicon carbide particle is the more relevant consideration in determining suitable material. Accordingly, the preferred silicon carbide powder for use in the present invention are specified as having from about 1 to about 100 $m^2/g$ surface area. Within this range, it is more preferred that the surface area of the silicon carbide particles range between about 5 and 50 $m^2/g$; and within this range, surface areas between about 7 and about 15 $m^2/g$ have been found to be easily obtainable and quite useful for producing sintered ceramic bodies of the present invention.

The silicon carbide starting material can be obtained from any of a variety of sources. Vapor phase reacted material is produced in fine particle size, and can be used if desired. Larger material can be ball milled until sufficient amounts of fine silicon carbide are obtained, and the proper size of silicon carbide can be selected from the ball milled product by conventional means, such as water sedimentation.

The crystalline habit of the silicon carbide is essentially non-critical except in the case where a high alpha silicon carbide content is desired in the sintered body. Alpha non-cubic silicon carbide is more readily available than beta silicon carbide, and therefore the preferred starting material contains silicon carbide which consists essentially of alpha, non-cubic crystalline silicon carbide. It is quite acceptable, however, to use silicon carbide which has been made by a process which produces mixtures of alpha and beta silicon carbide, and an operable starting material is silicon carbide which is predominantly alpha, non-cubic crystalline silicon carbide. It has also been shown to be operable to use raw batches wherein the silicon carbide comprises at least 5% alpha, non-cubic crystalline silicon carbide, and amorphous silicon carbide can also be used. It is even possible to use high purity beta silicon carbide starting material, but such material is not preferred because of the high expense of obtaining high purity beta silicon carbide powders.

In any event, it is preferred that the silicon carbide material shall have been treated with acid (such as hydrofluoric and/or nitric acids, particularly mixtures of hydrofluoric and nitric acids) to remove extraneous materials which may interfere with the sintering operation.

One of the more important features of the raw batch of the present invention is the carbonizable organic material. It has been found desirable that this material be organic in order that it be easily dispersable about the silicon carbide powder, in order to coat the silicon carbide powder and provide an intimate availability of carbonized organic material upon firing of the shaped body produced from the raw batch. The organic material can be organic solvent soluble, or soluble in water if a water solvent is used. It has been found desirable that the sintered ceramic body contain up to about 5.0% usually from about 0.5 to about 5.0%, of carbonized organic material, with the result that if the carbonizable, organic solvent soluble, organic material has a carbon content (char yield) of from about 25 to about 75% by weight, as is common, there should be present from about 0.67 to about 20 parts by weight of carbonizable organic material in the raw batch. Within the range of from about 25 to about 75% by weight carbon content, it is more common that the organic material have from about 33 to about 50% by weight, more particularly from about 40 to about 45% by weight, carbon content. If the carbon content is between about 33 and about 50% by weight, the amount of carbonizable organic material should range between about 1 and 12% by weight to produce the preferred amount of carbon in the form of carbonized organic material of from about 0.5 to about 4.0% by weight in the finished sintered ceramic body. The most preferred amount of carbonized organic material in the sintered ceramic body is believed to be about 2% by weight, so that the optimum raw batch should contain about 5% by weight of organic material having a carbon content between about 40 and 45% by weight. Particularly preferred carbonizable organic materials are phenolic resin and coal tar pitch, which have carbon contents of from about 40 to about 42% and on the order of 60%, respectively. As between the phenolic resin and coal tar pitch, the phenolic resin is more definitely preferred, and particularly a B-stage resole phenolic resin has been found to be particularly useful in the present invention.

The boron can be added to the raw batch as either elemental boron or as boron carbide. Boron carbide is essentially a non-stoichiometric material, and various boron carbide materials having a molar ratio of boron to carbon between 8:1 and 2:1 have been reported. It is in general preferred to use boron carbide as the boron source, and in particular boron carbide which is so-called "solid state reacted boron carbide" with a molar ratio of boron to carbon between about 3.5:1 and 4.1:1. Such boron carbide can be produced in accordance with the process of U.S. Pat. No. 3,379,647, P. A. Smudski. The process of the above Smudski patent is found to produce boron carbides having such a molar ratio, and such a molar ratio is preferred because with the higher boron to carbon ratio, the boron carbide either takes carbon or gives boron to the surrounding chemical species, which is desirable in the present instance as it promotes the desired densification during the firing step of the process of the present invention. Boron carbide materials having greater ratios of boron to carbide are even more chemically active than the material having a ratio of about 4.1:1 to about 3.5:1, but such materials are relatively less available and more expensive, and therefore are not preferred for that reason.

The amount of boron source to be added to the raw batch depends on the boron content of the boron source and the amount of boron to be present in the final sintered ceramic body. The sintered ceramic body should contain from about 0.15 to about 3.0% boron, and in particular from about 0.18 to about 0.36% boron is present in the most successfully densified bodies produced in accordance with the present invention. 0.36% is the optimum boron content of the sintered ceramic body. The amount of boron source should thus be chosen accordingly. Thus, if the boron source is elemental boron, it should be present in the raw batch from about 0.18 to about 0.36 parts by by weight to yield a sintered ceramic body having from about 0.18 to about 0.36% by weight boron. For the preferred solid state reacted boron carbide with a molar ratio of boron to carbon between about 3.5:1 and about 4.1:1, the boron carbide should be present in an amount from about 0.23 to about 0.46 parts by weight to produce such an amount of boron in the finished sintered ceramic body.

In any event, the boron source can be crystalline or non-crystalline, and preferably is particulate and of a size less than 30 microns. Within this limitation, it is preferred that the boron source be of a size ranging from about 0.1 to about 10 microns.

The temporary binder, if used, is preferably polyvinyl alcohol having associated therewith from about 5 to about 15 parts by weight water, per part of polyvinyl alcohol, as a temporary binder vehicle. In particular, it is preferred to use 10 parts by weight polyvinyl alcohol plus about 90 parts by weight water as a temporary binder vehicle. In addition to polyvinyl alcohol, however, other temporary binders can be used, such as coal tar pitch, long chain fatty material (for example "CARBOWAX" wax), metallic stearates such as aluminum stearates and zinc stearates, sugars, starches, alginates, and polymethyl phenylene. Many of these materials are, of course, capable as functioning as the carbonizable organic material which is added in sufficient quantity to yield the appropriate amount of carbonized organic material in the finished sintered ceramic body. A single material can thus serve two functions in the raw batch.

The process for producing the sintered ceramic body according to the present invention can begin with the mixing together from about 91 to about 99.85 parts by weight silicon carbide; from about 0.67 to about 20 parts by weight of the carbonizable organic material; from about 0.15 to about 5% by weight of the boron source; and up to about 15 parts by weight of temporary binder. The solvent can be added to this mixture, or the carbonizable organic material dissolved in the solvent first. If the temporary binder is polyvinyl alcohol including a quantity of water as temporary binder vehicle, this first mixing step preferably includes stirring the powdered materials (silicon carbide, organic material and boron source) together with the temporary binder and temporary binder vehicle, prior to adding an organic solvent in which the organic material is soluble. After the organic solvent is added, the components are preferably stirred in such a way as to disperse the carbonizable organic material about the silicon carbide powder and coat the silicon carbide powder therewith, suitably for at least about 5 minutes, and preferably about 15 minutes.

After the components have been stirred so as to disperse the organic material about the silicon carbide powder and coat the silicon carbide powder therewith, the stirred mixture is dried by any suitable technique, such as passing a quantity of drying gas near the stirred mixture, vacuum treating or by spray-drying the mixture. Following this drying step, the dried mixture is shaped in such a way as to produce a shaped body preferably having a density of at least about 1.60 g/cc. This shaping can be accomplished by any of a variety of techniques which are in themselves known, for example by extrusion, injection molding, transfer molding, casting, cold pressing, isostatic pressing, or by compression. If compression is used, preferred pressures are between about 4,000 and about 100,000 psi, with between about 16,000 and about 20,000 psi being preferred. If a temporary binder of polyvinyl alcohol is used, the next step of curing the temporary binder can be preferably accomplished by heating the shaped body at a temperature about 90° to about 100° C. for about 1 to about 2 hours. The shaped body is then fired to accomplish the densification necessary to produce the sintered ceramic body of the invention. Firing takes from about 20 to about 60 minutes at temperatures of from about 1900° to about 2500° C. Lower temperatures are in general inoperable, and higher temperatures may cause sublimation of the silicon carbide material. The firing step can be carried out in a conventional tube furnace wherein the shaped body is passed through the hot zone of the tube furnace to have a residence time at the desired temperature and for the desired time. Details of such tube furnaces are known in the prior art, and are disclosed for example in P. A. Smudski, U.S. Pat. No. 3,689,220. The firing step accomplished a "pressureless sintering," referred to herein for simplicity merely as "sintering". By "sintering" or "pressureless sintering" it is meant that no mechanical pressure is applied to the object being fired or sintered to enhance the reaction. Instead, the object being sintered is surrounded, usually in an inert container such as a graphite crucible, in up to about 1 atmosphere of pressure of an inert gas, a reducing gas, a vacuum, or nitrogen. Reducing gases include hydrogen, carbon dioxide and carbon monoxide; inert gases include argon, helium, and neon. The gases in which the sintering operation can be carried out thus include argon, carbon dioxide, carbon monoxide, helium, hydrogen, neon and nitrogen. Although nitrogen enters into reaction in a minor degree with the silicon carbide raw material, it does so in sufficiently minor degree that the composition of the sintered ceramic body is not noticeably changed. The use of nitrogen, however, does raise the necessary sintering temperature about 200° C., so that if nitrogen is the surrounding atmosphere, a preferred sintering temperature is from about 2260° C. to about 2300° C. In the other gases, particularly inert gases such as argon, helium or neon, a preferred sintering temperature is from about 2060° C. to about 2100° C. If it is desired to maintain an equiaxed crystal microstructure, these temperatures should be more closely controlled, as described above. The firing can also be carried out under vacuum, i.e., without any surrounding atmosphere. By "vacuum" is meant a practical vacuum, i.e., 1.0 mmHg or less.

Other preferred features for practicing the present invention are set forth in U.S. patent application Ser. No. 584,226, filed June 5, 1975 and its divisional application Ser. No. 790,354, filed Apr. 25, 1977. The disclosure of copending application Ser. No. 584,226, is incorporated herein by reference.

The invention will now be illustrated with several examples.

EXAMPLE 1

Sintered silicon carbide bodies were produced from mixes containing indicated amounts of submicron alpha silicon carbide having a surface area between about 10 and 12 m$^2$/g, B-stage phenol aldehyde resole resin containing indicated amount of carbon, and boron carbide powder (smaller than 10 mesh) containing indicated amounts of boron. The proportions are set forth in Table 1. For each experiment, 4.9 parts resin were mixed with 150 parts acetone for 5 minutes, the boron carbide powder added, and the suspension stirred for an additional 5 minutes. The silicon carbide powder was slowly added to the mixture and the combined mixture stirred 30 minutes to disperse the ingredients thoroughly. The mix was stirred while the acetone evaporated. After the batch was dry the powder cake was easily broken up into a granular array of particles by passing it through a 60 mesh screen. The particles were then pressed into compacts which were subsequently baked at 150° C. for 2 hours to cure the phenolic resin. The cured densities of the pieces in all cases were in excess of 1.70 g/cc.

Two photomicrographs for each experiment of polished and etched sections of these bodies are illustrated in the drawing.

Figure 3:
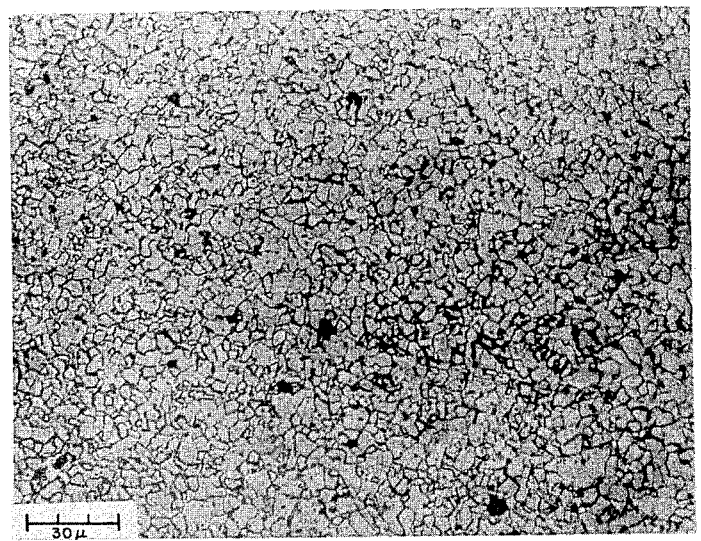

FIG. 2 is a lower magnification photomicrograph, originally 100×, illustrating a uniform equiaxed crystal microstructure. FIG. 3 is a higher magnification photomicrograph, originally 500×, illustrating this equiaxed crystal microstructure in greater detail.

Figure 4:
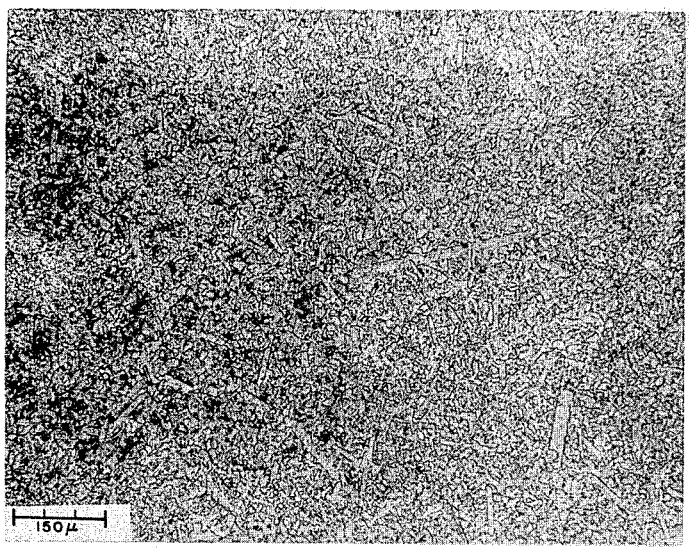
Figure 5:
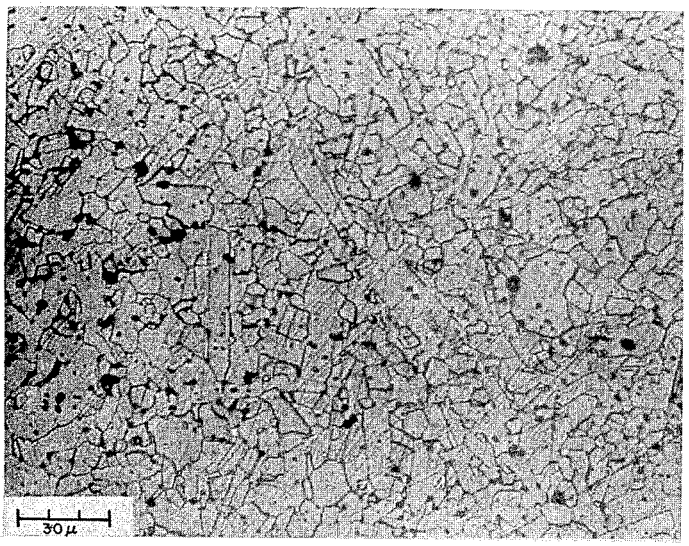

FIG. 4 is a lower magnification photomicrograph, originally 100×, illustrating the somewhat acicular microstructure obtained at a higher sintering temperature. FIG. 5 is a higher magnification photomicrograph originally 500×, of the same material illustrated in FIG. 4, illustrating the size and shape of the larger equiaxed grains (about 33% larger than that of the material fired at 2120° C.) produced by exercising close control over the process time and temperature. These FIGS. 4 and 5 illustrate a predominantly equiaxed microstructure containing some elongated grains or platelets.

Figure 6:
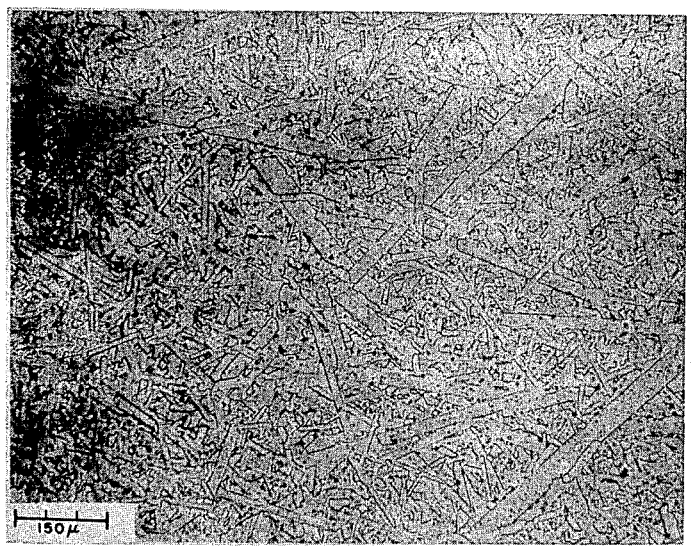
Figure 7:
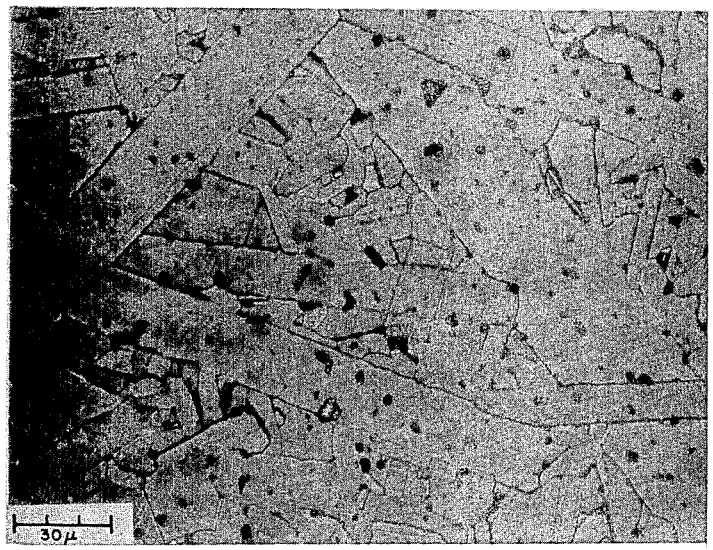

FIG. 6 is a lower magnification photomicrograph, originally 100×, illustrating the growth of large elongated grains or platelets within the matrix of the silicon carbide structure. FIG. 7 is a higher magnification photomicrograph, originally 500×, illustrating the size and shape of the large alpha silicon carbide grains and the way that these grains impinge upon one another in this predominantly acicular microstructure.

The amounts of alpha silicon carbide, carbon and boron used to produce the three sintered bodies in these experiments, together with the bulk densities, mean grain sizes for the first two experiments, bulk densities, sintering conditions and figure designations are set forth in the following Table.

TABLE 1

| EXPERIMENT | 1 | 2 | 3 |
|---|---|---|---|
| Parts SiC | 97.6 | 97.5 | 97.5 |
| Parts Carbon | 2.0 | 2.0 | 2.0 |
| Parts Boron | 0.4 | 0.5 | 0.5 |
| Mean Grain Size (Microns) | 7.5 | 10.0 | * |
| Sintering Temperature | 2120° C. | 2140° C. | 2200° C. |
| Sintering Time | 30 min | 45 min | 45 min |

TABLE 1-continued

| EXPERIMENT | 1 | 2 | 3 |
|---|---|---|---|
| Sintered Bulk Density | 3.15 g/cc | 3.17 g/cc | 3.11 g/cc |
| % Theoretical Density | 98.1 | 98.8 | 96.9 |
| Figures | 2 & 3 | 4 & 5 | 6 & 7 |

*Not possible to determine because of the extreme degree of exaggerated grain growth.

The differences observed between FIGS. 2 and 3; FIGS. 4 and 5; and FIGS. 6 and 7, are believed to be due to the different times and temperatures of sintering, and not due to the minor variation in mix content for the materials which were used to form the green bodies.

EXAMPLE 2

Silicon carbide powder compacts were produced from alpha phase silicon carbide powder, phenolic resin sufficient to yield 2% by weight of carbon when carbonized, and boron carbide containing 0.3%, 1.0% and 3.0% by weight of boron. Two specimens of each composition were sintered in a 6-inch diameter tube furnace maintained at a temperature of 2150° C. The specimens were run through the furnace at a speed of ½-inch per minute, producing a hot zone residence time of approximately 25 minutes in either a "seasoned" (boron-saturated) graphite boat or an "unseasoned" graphite boat. The results are set forth in Table 2.

TABLE 2

| Experiment No. | Type of Graphite Boat | Percent Boron | Cured Density g/cc | Fired Density g/cc | Fired Density % Theoretical |
|---|---|---|---|---|---|
| 4 | Unseasoned | 0.3 | 1.73 | 2.83 | 88.2 |
| 5 | Unseasoned | 1.0 | 1.73 | 3.05 | 95.0 |
| 6 | Unseasoned | 3.0 | 1.71 | 3.01 | 93.8 |
| 7 | Seasoned | 0.3 | 1.73 | 3.16 | 98.4 |
| 8 | Seasoned | 1.0 | 1.72 | 3.14 | 97.8 |
| 9 | Seasoned | 3.0 | 1.71 | 3.11 | 96.9 |

This example illustrates the effect of the use of an unseasoned boat on the fired density of the sintered silicon carbide article.

EXAMPLE 3

This example is similar to Example 2 except that instead of a tube furnace, the silicon carbide bodies were sintered in a laboratory furnace, the temperature of which was varied while the specimens remained stationary within the furnace. One pellet from each composition was placed in a graphite crucible which was well boronated and open. The furnace components other than the crucible were also well boronated. The atmosphere inside the furnace was argon. The temperature was raised to 1500° C. over a period of 4.5 hours, and then raised at a rate of 300° C. per hour until a temperature of 2120° C. was attained, which was held for 45 minutes. The experiment was then repeated, except that instead of placing the specimens in an open boronated graphite crucible, they were placed in an unboronated graphite crucible, separated by graphite plates and covered to protect the bodies from the boron in the furnace walls, etc. The results are set forth in Table 3.

TABLE 3

| Experiment No. | Type of Graphite Boat | Percent Boron | Cured Density g/cc | Fired Density g/cc | Fired Density % Theoretical |
|---|---|---|---|---|---|
| 10 | Uncovered Seasoned | 0.3 | 1.729 | 3.175 | 98.9 |
| 11 | Uncovered Seasoned | 1.0 | 1.712 | 3.161 | 98.5 |
| 12 | Uncovered Seasoned | 3.0 | 1.726 | 3.137 | 97.7 |
| 13 | Covered Unseasoned | 0.3 | 1.729 | 3.007 | 93.7 |
| 14 | Covered Unseasoned | 1.0 | 1.736 | 2.992 | 93.2 |
| 15 | Covered Unseasoned | 3.0 | 1.729 | 2.931 | 91.3 |

This example illustrates that the effect of an unseasoned boat illustrated in the previous example is not specified to a particular type of furnace, although in the present example the lower fired densities obtained with an unseasoned boat might be partially attributed to the temperature differential produced by the graphite plates separating and covering the samples being sintered.

We claim:

1. A sintered ceramic body consisting essentially of:
    (a) from about 91 to about 99.85% by weight silicon carbide, wherein at least 95% by weight of the silicon carbide is of the alpha phase;
    (b) up to about 5.0% by weight carbonized organic material;
    (c) from about 0.15 to about 3.0% by weight boron; and
    (d) up to about 1.0% by weight additional carbon; and having a predominantly equiaxed microstructure.

2. A sintered ceramic body according to claim 1, having a density of at least about 2.40 g/cc.

3. A sintered ceramic body according to claim 2, wherein at least about 99% by weight of the silicon carbide is of the alpha phase.

4. A sintered ceramic body according to claim 2, wherein the silicon carbide consists essentially of silicon carbide of the alpha phase.

5. A sintered ceramic body according to claim 2, having a microstructure containing at least about 90% equiaxed grains.

6. A sintered ceramic body according to claim 2, having a microstructure consisting essentially of equiaxed grains.

7. A sintered ceramic body according to claim 1, having a density of at least about 2.90 g/cc.

8. A sintered ceramic body according to claim 7, wherein at least about 99% by weight of the silicon carbide is of the alpha phase.

9. A sintered ceramic body according to claim 7, wherein the silicon carbide consists essentially of silicon carbide of the alpha phase.

10. A sintered ceramic body according to claim 7, having a microstructure containing at least about 90% equiaxed grains.

11. A sintered ceramic body according to claim 7, having a microstructure consisting essentially of equiaxed grains.

12. A sintered ceramic body according to claim 1, having a density of at least about 3.05 g/cc.

13. A sintered ceramic body according to claim 12, wherein at least about 99% by weight of the silicon carbide is of the alpha phase.

14. A sintered ceramic body according to claim 12, wherein the silicon carbide consists essentially of silicon carbide of the alpha phase.

15. A sintered ceramic body according to claim 12, having a microstructure containing at least about 90% equiaxed grains.

16. A sintered ceramic body according to claim 12, having a microstructure consisting essentially of equiaxed grains.

* * * * *